(12) United States Patent
Kotlar et al.

(10) Patent No.: US 7,807,609 B2
(45) Date of Patent: Oct. 5, 2010

(54) WELL TREATMENT PROCESS

(75) Inventors: Hans Kristian Kotlar, Stavanger (NO);
Olav Martin Selle, Stavanger (NO);
Oddvar Arnfinn Aune, Stavanger (NO);
Lars Kilaas, Stavanger (NO); Anne Dalager Dyrli, Stavanger (NO)

(73) Assignee: Statoil ASA, Stavanger (NO)

( * ) Notice: Subject to any disclaimer, the term of this patent is extended or adjusted under 35 U.S.C. 154(b) by 0 days.

(21) Appl. No.: 12/276,191

(22) Filed: Nov. 21, 2008

(65) Prior Publication Data

US 2009/0163385 A1    Jun. 25, 2009

Related U.S. Application Data

(63) Continuation of application No. 10/432,190, filed as application No. PCT/GB01/05081 on Nov. 19, 2001, now Pat. No. 7,473,672.

(30) Foreign Application Priority Data

Nov. 20, 2000    (GB) .................................. 0028268.1

(51) Int. Cl.
*C09K 8/00*    (2006.01)
*B32B 1/00*    (2006.01)
*B32B 27/00*    (2006.01)

(52) U.S. Cl. ........................ 507/219; 507/902; 507/939; 428/402

(58) Field of Classification Search ....................... None
See application file for complete search history.

(56) References Cited

U.S. PATENT DOCUMENTS

| 3,320,196 | A  | 5/1967  | Rogers        |
|-----------|----|---------|---------------|
| 4,857,493 | A  | 8/1989  | Ford et al.   |
| 4,920,004 | A  | 4/1990  | Bagchi        |
| 5,109,038 | A  | 4/1992  | Chauvel et al.|
| 5,397,695 | A  | 3/1995  | Sutton et al. |
| 5,437,331 | A  | 8/1995  | Gupta et al.  |
| 5,447,199 | A  | 9/1995  | Dawson et al. |
| 5,874,064 | A  | 2/1999  | Edwards et al.|
| 6,136,711 | A  | 10/2000 | Grumbine et al.|
| 6,221,829 | B1 | 4/2001  | Symes et al.  |
| 6,326,335 | B1 | 12/2001 | Kowalski et al.|
| 6,426,321 | B1 | 7/2002  | Durrieu et al.|
| 6,447,717 | B1 | 9/2002  | Fan et al.    |

FOREIGN PATENT DOCUMENTS

| NO | 311736 B1  | 11/1994 |
| NO | 310039 B1  | 2/1995  |
| WO | 01/34939 A1| 5/2001  |

*Primary Examiner*—Michael J Feely
(74) *Attorney, Agent, or Firm*—Sughrue Mion, PLLC

(57) ABSTRACT

The invention provides a method for the treatment of a hydrocarbon well which method comprises administering, down said well, polymeric particles having covalently bound to a polymeric component thereof a well treatment chemical or a precursor thereof, wherein the particles contain covalent bonds scissile in an aqueous environment to release or expose said chemical or precursor.

5 Claims, 2 Drawing Sheets

WELL TREATMENT PROCESS

CROSS REFERENCE TO RELATED APPLICATIONS

This is a continuation of application Ser. No. 10/432,190, filed Oct. 27, 2003 (now U.S. Pat. No. 7,473,672), which is a National Stage Application under §371 of PCT Application No. PCT/GB01/05081, filed Nov. 19, 2001. The entire disclosures of the prior applications, application Ser. Nos. 10/432,190 and PCT/GB01/05081 are hereby incorporated by reference.

BACKGROUND OF THE INVENTION

This invention relates to a method of treating a hydrocarbon well with well treatment chemicals, in particular by down-hole placement of polymeric particles carrying well treatment chemicals or precursors or generators thereof, and to such particles and compositions and structures containing them.

During the operation of a hydrocarbon well (i.e. a gas or oil well) various down-hole problems arise such as corrosion of metal fittings, hydrocarbon flow-inhibiting deposition (e.g. of scale, gas clathrates, metal sulphides, waxes, gel polymers, microbial debris, etc.), generation of toxic hydrogen sulphide by sulphate-reducing bacteria, increased water flow into the producer bore, etc.

Thus, for example, where sea water is injected through an injection bore hole into an oil-bearing stratum to drive oil through the formation (i.e. the rock) into the producer well hole, differences in solutes in the injection water and the water already present in the formation can cause metal salts to precipitate as scale so causing gradually increasing clogging of the producer well hole.

Typically this is dealt with by applying a "squeeze" of scale inhibitor chemicals, i.e. chemicals which break down the scale and increase oil or gas flow. This generally involves ceasing hydrocarbon flow, forcing an aqueous solution of the scale inhibitor down the producer bore under pressure to drive the inhibitor solution into the formation, and restarting production. Such treatment generally allows a further six or so months of hydrocarbon flow before a further squeeze is required and each squeeze causes some damage to the formation surrounding the producer bore hole and as a result an increased flow of formation fragments (i.e. rock grains etc.) into the bore.

The producer bore hole in an oil well is generally lined in the hydrocarbon bearing stratum with "gravel packs", sand containing filter elements, which serve to trap formation fragments and it has been proposed to include in such gravel packs ceramic particles coated with or impregnated with well treatment chemicals such as scale inhibitors (see EP-A-656459 and WO 96/27070) or bacteria (see WO 99/36667). Likewise treatment of the formation surrounding the producer well bore hole with well treatment chemicals before hydrocarbon production begins has also been proposed, e.g. in GB-A-2290096 and WO 99/54592.

Various polymeric, oligomeric, inorganic and other particulate carriers for well treatment chemicals are also known, e.g. ion exchange resin particles (see U.S. Pat. No. 4,787,455), acrylamide polymer particles (see EP-A-193369), gelatin capsules (see U.S. Pat. No. 3,676,363), oligomeric matrices and capsules (see U.S. Pat. Nos. 4,986,353 and 4,986,354), ceramic particles (see WO 99/54592, WO 96/27070 and EP-A-656459), and particles of the well treatment chemical itself (see WO 97/45625).

Particles coated or impregnated with or encapsulating a well treatment chemical however have the inherent problem that release of the well treatment chemical will take place relatively rapidly once the particles encounter water down-hole. Accordingly the protection they provide is relatively short lived.

There is thus a continuing need for well treatments which provide prolonged protection.

BRIEF SUMMARY OF THE INVENTION

Viewed from one aspect the present invention thus provides a method for the treatment of a hydrocarbon well which method comprises administering down said well polymeric particles having covalently bound to a polymeric component thereof a well treatment chemical or a precursor thereof, said particles containing covalent bonds scissile in an aqueous environment to release or expose said chemical or precursor.

Viewed from a further aspect the invention provides polymeric particles having covalently bound to a polymeric component thereof a well treatment chemical or a precursor thereof, said particles containing covalent bonds scissile in an aqueous environment to release or expose said chemical or precursor.

Viewed from another aspect the invention provides the use for the manufacture of hydrocarbon well treatment compositions of polymeric particles having covalently bound to a polymeric component thereof a well treatment chemical or a precursor thereof, said particles containing covalent bonds scissile in an aqueous environment to release or expose said chemical or precursor.

Viewed from a still further aspect the invention comprises a hydrocarbon well treatment composition comprising a carrier liquid containing polymeric particles having covalently bound to a polymeric component thereof a well treatment chemical or a precursor thereof, said particles containing covalent bonds scissile in an aqueous environment to release or expose said chemical or precursor.

Viewed from a yet further aspect the invention comprises a tubular filter for down-hole placement containing polymeric particles having covalently bound to a polymeric component thereof a well treatment chemical or a precursor thereof, said particles containing covalent bonds scissile in an aqueous environment to release or expose said chemical or precursor.

In the method of the invention the polymer particles may be placed down hole before and/or after hydrocarbon production (i.e. extraction of oil or gas from the well) has begun. Preferably the particles are placed down hole before production has begun, especially in the completion phase of well construction.

The particles may be placed within the bore hole (e.g. in the hydrocarbon bearing strata or in ratholes) or within the surrounding formation (e.g. in fissures or within the rock itself). In the former case, the particles are conveniently contained within a tubular filter, e.g. a gravel pack or a filter structure as disclosed in EP-A-656459 or WO 96/27070; in the latter case, the particles are preferably positioned by squeezing a liquid composition containing the particles down the bore hole. Preferably, before production begins the particles are placed both within the bore in a filter and within the surrounding formation.

Where the particles are placed within the surrounding formation, the pressure used should be sufficient to cause the particles to penetrate at least 1 m, more preferably at least 1.5 m, still more preferably at least 2 m, into the formation. If desired, the particles may be applied in conjunction with proppant particles (e.g. as described in WO 99/54592) to achieve a penetration of up to about 100 m into the formation. Compositions comprising proppant particles and polymer particles according to the invention form a further aspect of the invention.

The polymer particles of the invention, which may be porous or non-porous but preferably are porous, may have a wide range of possible structures, several of which are illustrated schematically in the accompanying drawings.

Figure 1:
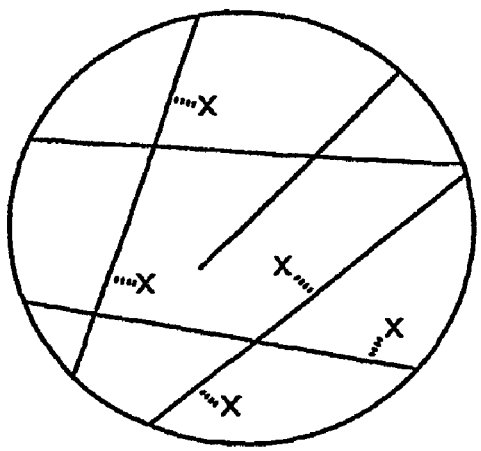
FIG. 1 illustrates the case where the chemical or precursor is bonded via a scissile bond to the polymer matrix.
Figure 2:
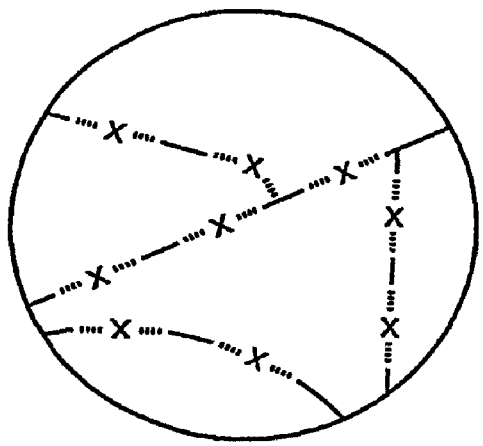
FIG. 2 illustrates the case where the chemical or precusor is itself a component of a polymeric or oligomeric part of the particle which is degradable to release the chemical or precursor.
Figure 3:
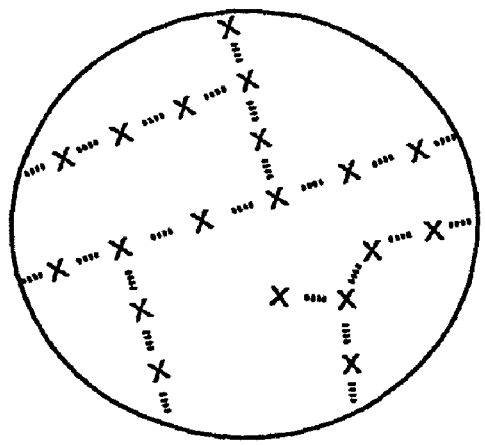
FIG. 3 illustrates the case where the chemical or precursor is a releasable part of the overall polymer matrix.
Figure 4:
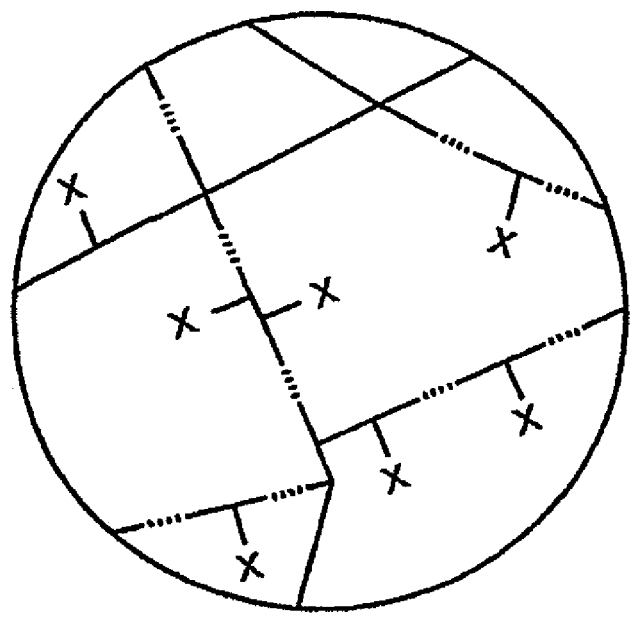
FIGS. 4 and 5 illustrate cases where the scissile bonds are present in the backbone or cross-links of a polymer matrix to which the chemical or precursor is covalently bound, whereby bond scission breaks down the particle exposing the chemical or precursor.
Figure 5:
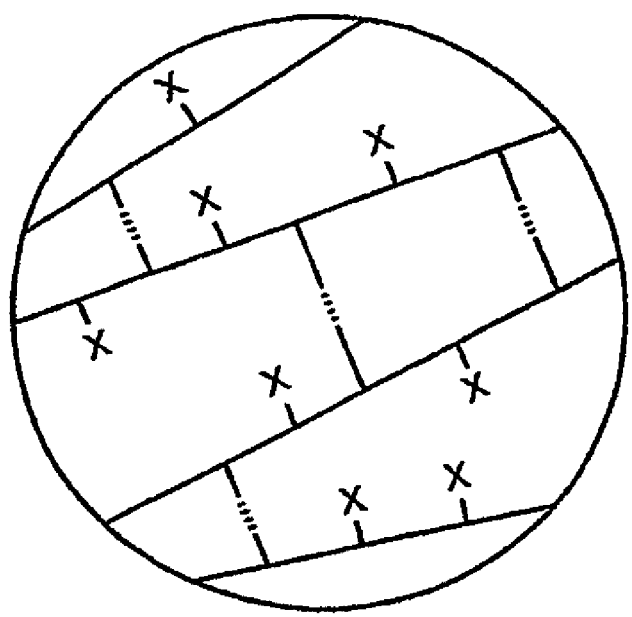

In these schematic illustrations, dotted lines represent scissile bonds, continuous lines polymer or oligomer backbones and X the chemical or precursor.

DETAILED DESCRIPTION OF THE INVENTION

The scissile bonds in the polymer particles of the invention may be any bonds subject to scission in the presence of formation or injection water under the temperature conditions experienced down hole, e.g. 70 to 150° C. Suitable such bonds include amide, ester, disulphide, diester, peroxide, etc. bonds. These bonds may be formed by conjugation of the chemical or precursor to a functionalized polymer matrix (e.g. one having unsaturated carbon-carbon bond, or pendant hydroxy, thiol, amine or acid groups), or by the oligomerization or polymerization process, or they may be incorporated within a monomer or comonomer used in the oligomerization or polymerisation process, they may be incorporated within a cross-linking agent or formed by a cross-linking reaction, or they may be incorporated in the reagent which serves to introduce the chemical or precursor, i.e. a compound A-B-C where A is a moiety which binds to the polymer matrix, B is the scissile bond and C is the chemical or precursor moiety.

If desired, the particles may be impregnated with agents which, under down-hole conditions, will promote scission of the scissile bonds, e.g. enzymes, acids, bases, metal complexes, etc.

The rate of chemical or precursor release can accordingly be selected or controlled by selection of the properties of the particles (e.g. choice of monomer, degree of cross-linking, polymer molecular weight, particle size, porosity, nature of the scissile bonds, nature of other materials impregnated into the particles, etc.) to match properties of the down-hole environment, e.g. temperature, salinity, pH etc.

The particles according to the invention advantageously have mode particle sizes (e.g. as measured with a Coulter particle size analyser) of 1 µm to 5 mm, more preferably 10 µm to 1000 µm, especially 250 to 800 µm. For placement within the formation, the mode particle size is preferably 1 to 50 µm, especially 2 to 20 µm. For any particular formation, formation permeability (which correlates to the pore throat sizes in the formation) may readily be determined using rock samples taken during drilling and the optimum particle size may thus be determined. If the particles have a low dispersity (i.e. size variation), a highly uniform deposition and deep penetration into the formation can be achieved. For this reason, the particles preferably have a coefficient of variation (CV) of less than 10%, more preferably less than 5%, still more preferably less than 2%.

CV is determined in percentage as $$CV = \frac{100 \times \text{standard deviation}}{\text{mean}}$$

where mean is the mean particle diameter and standard deviation is the standard deviation in particle size. CV is preferably calculated on the main mode, i.e. by fitting a monomodal distribution curve to the detected particle size distribution. Thus some particles below or above mode size may be discounted in the calculation which may for example be based on about 90% of total particle number (of detectable particles that is). Such a determination of CV is performable on a Coulter LS 130 particle size analyzer.

For placement in filters, the particles preferably have mode particle sizes of 50 to 5000 µm, more especially 50 to 1000 µm, still more preferably 100 to 500 µm. In such filters, the particles preferably constitute 1 to 99% wt, more preferably 2 to 30% wt, still more preferably 5 to 20% wt of the particulate filter matrix, the remaining matrix comprising particulate oil- and water-insoluble inorganic material, preferably an inorganic oxide such as silica, alumina or alumina-silica. Particularly preferably, the inorganic oxide has a mode particle size which is similar to that of the polymer particles, e.g. within 20%, more preferably within 10%. As with the in-formation placement, the polymer particles preferably have low dispersity, e.g. a CV of less than 10%, more preferably less than 5%, still more preferably less than 2%. The low dispersity serves to hinder clogging of the filters.

Preferably the polymer matrix of the particles has a softening point above the temperatures encountered down hole, e.g. one above 70° C., more preferably above 100° C., still more preferably above 150° C.

The well treatment chemicals or precursors thereof which the particles contain may be any agents capable of tackling down hole problems, such as corrosion, hydrocarbon flow reduction, or $H_2S$ generation. Examples of such agents include scale inhibitors, foamers, corrosion inhibitors, biocides, surfactants, oxygen scavengers, etc.

The particles may contain a well treatment chemical itself or a precursor chemical compound which in situ will react, e.g. break down, to produce a well treatment chemical, or alternatively it may be a biological agent, e.g. an enzyme which produces a well treatment chemical.

Examples of typical well treatment chemicals, precursors and generators are mentioned in the patent publications mentioned herein, the contents of all of which are hereby incorporated by reference.

Thus for example typical scale inhibitors include inorganic and organic phosphonates (e.g. sodium aminotrismethylenephosphonate), polyaminocarboxylic acids, polyacrylamines, polycarboxylic acids, polysulphonic acids, phosphate esters, inorganic phosphates, polyacrylic acids, inulins (e.g. sodium carboxymethyl inulin), phytic acid and derivatives (especially carboxylic derivatives) thereof, polyaspartates, etc.

Examples of preferred well treatment chemicals include: hydrate inhibitors, scale inhibitors, asphaltene inhibitors, wax inhibitors and corrosion inhibitors. Such inhibitors are well known to those working in the field of well treatment.

Where the particles are placed within the formation, they are preferably applied as a dispersion in a liquid carrier. For pre- and post-completion application, the liquid carrier preferably comprises a non-aqueous organic liquid, e.g. a hydrocarbon or hydrocarbon mixture, typically a $C_3$ to $C_{15}$ hydrocarbon, or oil, e.g. crude oil. For curative treatment, i.e. after production has continued for some time, the liquid carrier may be aqueous or non-aqueous.

The invention will now be described further with reference to the following non-limiting Examples:

Example 1

1.8 g of methacrylic acid anhydride, 4.2 g of diethylvinyl phosphonate, and 4 g of toluene are mixed and 0.3 g of dibenzoylperoxide is added to the mixture. This oil phase is dispersed in a solution of 0.03 g of 87-89% hydrolysis grade polyvinylalcohol in 70 g water in a reactor. The resulting suspension is stirred at 150 rpm at 80° C. for 6 hours after which the resulting suspension polymerized particles are removed by filtration, washed with toluene and dried.

The invention claimed is:

1. A dispersion comprising polymeric particles dispersed in a liquid hydrocarbon carrier, said polymeric particles having covalently bound to a polymeric component thereof a well treatment chemical or precursor thereof, wherein said particles contain covalent bonds scissile in an aqueous environment to release or expose said chemical or precursor thereof and are impregnated with an agent capable of promoting scission of said scissile covalent bonds.

2. The dispersion according to claim 1, wherein said scissile covalent bonds are selected from the group consisting of amide, ester, disulphide, diester and peroxide bonds.

3. The dispersion according to claim 1, wherein said agent is selected from the group consisting of acids, enzymes, bases and metal complexes.

4. The dispersion according to claim 1, wherein said well treatment chemical is selected from the group consisting of scale inhibitors, corrosion inhibitors, wax inhibitors, hydrate inhibitors, asphaltene inhibitors, foamers, biocides, surfactants, oxygen scavengers and bacteria.

5. A hydrocarbon well treatment composition comprising the dispersion according to claim 1.

* * * * *